(12) United States Patent
Matsuo et al.

(10) Patent No.: US 10,439,458 B2
(45) Date of Patent: Oct. 8, 2019

(54) PERMANENT MAGNET ROTOR FOR ROTARY ELECTRIC MACHINE

(71) Applicant: MEIDENSHA CORPORATION, Tokyo (JP)

(72) Inventors: Keisuke Matsuo, Tokyo (JP); Takashi Okitsu, Tokyo (JP); Mototsugu Omura, Tokyo (JP); Morio Takada, Tokyo (JP); Daiki Matsuhashi, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/090,646

(22) PCT Filed: Mar. 9, 2017

(86) PCT No.: PCT/JP2017/009369
§ 371 (c)(1),
(2) Date: Oct. 2, 2018

(87) PCT Pub. No.: WO2017/175534
PCT Pub. Date: Oct. 12, 2017

(65) Prior Publication Data
US 2019/0115797 A1      Apr. 18, 2019

(30) Foreign Application Priority Data
Apr. 7, 2016    (JP) .................................. 2016-077063

(51) Int. Cl.
*H02K 1/27* (2006.01)
*H02K 1/22* (2006.01)
(Continued)

(52) U.S. Cl.
CPC ............... *H02K 1/278* (2013.01); *H02K 1/22* (2013.01); *H02K 1/27* (2013.01); *H02K 1/30* (2013.01); *H02K 15/03* (2013.01)

(58) Field of Classification Search
CPC ..................... H02K 1/278; H02K 1/30; H02K 1/28; H02K 15/03; H02K 15/16; H02K 15/165; H02K 7/003; H02K 7/04
(Continued)

(56) References Cited

U.S. PATENT DOCUMENTS 5,486,730 A  *  1/1996  Ludwig .................. H02K 1/278
                                                    156/293
2012/0256500 A1   10/2012  Mann et al.
(Continued)

FOREIGN PATENT DOCUMENTS

GB         2 299 217 A        9/1996
GB         2299217 A    *    9/1996    ............. H02K 1/278
(Continued)

*Primary Examiner* — Michael Andrews
(74) *Attorney, Agent, or Firm* — Foley & Lardner LLP

(57) ABSTRACT

The present invention comprises a permanent magnet (13) that is disposed around a rotor shaft (11), a retaining ring (14) that is press-fitted around the outside of the permanent magnet (13) from one end of the rotor shaft (11) so as to retain the permanent magnet (13) against the rotor shaft (11), and an end plate (12) that is provided adjacent to the permanent magnet (13) in the axial direction of the rotor shaft (11) and guides the press-fitted retaining ring (14), maintaining planar contact with the inner circumferential surface thereof, toward the permanent magnet (13) while causing the retaining ring (14) to expand as the retaining ring (14) progresses from one end of the rotor shaft (11) to the other end of the rotor shaft (11). Concentration of stress on the retaining ring (14) during press-fitting can thus be minimized.

17 Claims, 9 Drawing Sheets

(51) Int. Cl.
*H02K 1/30* (2006.01)
*H02K 15/03* (2006.01)

(58) Field of Classification Search
USPC ............ 310/156.08, 156.11, 156.28, 156.29, 310/156.31, 271
See application file for complete search history.

(56) References Cited

U.S. PATENT DOCUMENTS

| 2014/0300233 | A1 | 10/2014 | Arimatsu |
| 2016/0141931 | A1* | 5/2016 | Kawai ..................... H02K 1/30 310/156.12 |

FOREIGN PATENT DOCUMENTS

| JP | 8-265997 A | 10/1996 |
| JP | 2004-72968 A | 3/2004 |
| JP | 2005-312250 A | 11/2005 |
| JP | 2013-514754 A | 4/2013 |
| JP | 2013-165548 A | 8/2013 |
| JP | 2014-212680 A | 11/2014 |
| WO | WO 2011-073311 A2 | 6/2011 |

* cited by examiner

PERMANENT MAGNET ROTOR FOR ROTARY ELECTRIC MACHINE

TECHNICAL FIELD

The present invention relates to a rotor for a permanent magnet rotary electric machine, and specifically relates to a rotor for a permanent magnet rotary electric machine in which multiple permanent magnets are fixed to a surface of a rotor shaft by using retaining rings.

BACKGROUND ART

Rotors for a permanent magnet rotary electric machine include, for example, a rotor of a surface permanent magnet (SPM) rotary electric machine in which multiple permanent magnets are fixed to a surface of a rotor shaft by press-fitting retaining rings.

For example, Patent Literature 1 listed below discloses a rotor for a permanent magnet rotary electric machine which includes multiple permanent magnets fixed to an outer surface of a rotor shaft and a tubular carbon fiber reinforced plastic ring (hereafter, referred to as CFRP ring) fitted to outer surfaces of the multiple permanent magnets. In this rotor, an interference is provided between the inner diameter of the CFRP ring and the outer diameter of the permanent magnets and the multiple permanent magnets are firmly fixed to the rotor shaft by press-fitting the CFRP ring.

Patent Literature 2 discloses a permanent magnet rotor including multiple permanent magnets bonded to a center portion of a rotor hub and multiple retaining rings fitted to outer surfaces of the multiple permanent magnets. The multiple permanent magnets are machined such that a tapered surface continuous from one axial end side to another axial end side of the rotor hub is formed on the outer peripheral surfaces of the permanent magnets as a whole. The retaining rings are each press-fitted while being provided with a predetermined interference to the outer peripheral surface of the corresponding permanent magnet.

CITATION LIST

Patent Literature

Patent Literature 1: Japanese Patent Application Publication No. 2005-312250
Patent Literature 2: Japanese Patent Application Publication No. Hei 8-265997

SUMMARY OF INVENTION

Technical Problem

However, in Patent Literature 1 described above, the diameter of the CFRP ring is instantaneously increased by an amount corresponding to the interference in the step of press-fitting. Accordingly, stress is concentrated in an inner peripheral surface of the CFRP ring which comes into contact with corner portions of the permanent magnets which are end portions in the axial direction of the rotor shaft, and there is a risk of a decrease in strength depending on the degree of stress. Accordingly, it has been considered that improvements can be made when there is a demand for improved strength.

In Patent Literature 2 described above, since one permanent magnet rotor includes multiple retaining rings with different inner diameters, the cost may increase. Moreover, in one axial end portion (portion where the inner diameter of the retaining ring is small) of the permanent magnet rotor, a gap between the permanent magnet rotor and a stator disposed outside the permanent magnet rotor is larger than that in the other axial end portion (portion where the inner diameter of the retaining ring is large) and the volume of the permanent magnet is smaller than that in the other axial end portion. This leads to a problem that the electrical characteristics are poorer by a degree corresponding to the larger gap and the smaller volume.

The present invention has been proposed in view of the problems described above and an object thereof is to provide a rotor for a permanent magnet rotary electric machine which can suppress concentration of stress in a retaining ring in press-fitting while retaining electrical characteristics in a simple configuration.

Solution to Problem

A rotor for a permanent magnet rotary electric machine according to a first aspect of the invention to solve the above problem includes:

a permanent magnet disposed on an outer peripheral surface of a rotor shaft;

a retaining ring press-fitted to an outside of the permanent magnet from one end portion side of the rotor shaft to retain the permanent magnet on the rotor shaft; and a ring guide portion provided adjacent to the permanent magnet in an axial direction of the rotor shaft, the ring guide portion configured to come into surface contact with an inner peripheral surface of the press-fitted retaining ring and guide the retaining ring toward the permanent magnet while gradually increasing a diameter of the retaining ring as the retaining ring is moved from the one end portion side of the rotor shaft toward another end portion side of the rotor shaft.

A rotor for a permanent magnet rotary electric machine according to a second aspect of the invention to solve the above problem is the rotor for a permanent magnet rotary electric machine according to the first aspect of the invention, in which the ring guide portion is a ring member fixed to the outer peripheral surface of the rotor shaft, and a diameter of an outer peripheral surface of the ring member gradually decreases from the permanent magnet side toward the opposite side in the axial direction of the rotor shaft.

A rotor for a permanent magnet rotary electric machine according to a third aspect of the invention to solve the above problem is the rotor for a permanent magnet rotary electric machine according to the second aspect of the invention, in which the ring member is a non-magnetic body.

A rotor for a permanent magnet rotary electric machine according to a fourth aspect of the invention to solve the above problem is the rotor for a permanent magnet rotary electric machine according to the first aspect of the invention, in which the rotor shaft has a large-diameter portion which is provided on the one end portion side of the rotor shaft and which has a larger diameter than a portion of the outer peripheral surface of the rotor shaft on which the permanent magnet is disposed, the ring guide portion is the large-diameter portion, and a diameter of an outer peripheral surface of the large-diameter portion gradually decreases from the permanent magnet side toward the opposite side in the axial direction of the rotor shaft.

A rotor for a permanent magnet rotary electric machine according to a fifth aspect of the invention to solve the above problem is the rotor for a permanent magnet rotary electric machine according to the fourth aspect of the invention, in which a diameter of a portion adjacent to the large-diameter portion in the portion of the outer peripheral surface of the rotor shaft on which the permanent magnet is disposed gradually decreases toward the ring guide portion side in the axial direction of the rotor shaft.

A rotor for a permanent magnet rotary electric machine according to a sixth aspect of the invention to solve the above problem is the rotor for a permanent magnet rotary electric machine according to the fifth aspect of the invention, in which a rate of gradual decrease of the diameter in the portion adjacent to the large-diameter portion in the portion of the outer peripheral surface of the rotor shaft on which the permanent magnet is disposed is the same as a rate of gradual decrease of the diameter of the outer peripheral surface in the large-diameter portion in the axial direction of the rotor shaft.

A rotor for a permanent magnet rotary electric machine according to a seventh aspect of the invention to solve the above problem is the rotor for a permanent magnet rotary electric machine according to any one of the first to sixth aspects of the invention, in which height of an outer peripheral surface of the ring guide portion in an end portion adjacent to the permanent magnet in the axial direction is the same as height of an out surface of an outer peripheral surface of the permanent magnet.

A rotor for a permanent magnet rotary electric machine according to an eighth aspect of the invention to solve the above problem is the rotor for a permanent magnet rotary electric machine according to any one of the first to seventh aspects of the invention, in which the retaining ring is molded from carbon fiber reinforced plastic obtained by continuously winding a carbon fiber in one way in the circumferential direction and impregnating the carbon fiber with synthetic resin.

A rotor for a permanent magnet rotary electric machine according to a ninth aspect of the invention to solve the above problem is the rotor for a permanent magnet rotary electric machine according to the eighth aspect of the invention, in which a start point of winding of the carbon fiber is disposed on an inner peripheral side of the retaining ring and an end point of the winding of the carbon fiber is disposed on an outer peripheral side of the retaining ring, and the retaining ring is press-fitted to the rotor shaft such that a winding direction of the carbon fiber is opposite to a rotating direction of rotor shaft.

Advantageous Effects of Invention

According to the present invention, the rotor includes the ring guide portion and the diameter of the retaining ring is thereby gradually increased instead of being instantaneously increased when the retaining ring is press-fitted from the one end portion side of the rotor shaft. Then, when the retaining ring is further-deeply press-fitted, the retaining ring is smoothly moved from the ring guide portion to the permanent magnet with the diameter of the retaining ring increased. Accordingly, an axial end portion (corner portion) of the permanent magnet does not come into point contact or linear contact with the inner peripheral surface of the retaining ring, and the concentration of stress in the inner peripheral surface of the retaining ring due to such contact can be eliminated. In this configuration, there is no need to process the permanent magnet and the retaining ring into special shapes and it is only necessary to provide the ring guide portion. Accordingly, it is possible to suppress the concentration of stress in the retaining ring in the press-fitting while retaining electrical characteristics, in a simple configuration.

Moreover, the retaining ring is molded from carbon fiber reinforced plastic obtained by continuously winding a carbon fiber in one way in the circumferential direction and impregnating the carbon fiber with synthetic resin. Furthermore, the retaining ring formed as described above is press-fitted to the rotor shaft such that the winding direction of the carbon fiber is opposite to the rotating direction of rotor shaft. Accordingly, the strength of the retaining ring can be maintained also when peel force generated by air flow caused by high-speed rotation of a rotor metal core acts on the retaining ring.

DESCRIPTION OF EMBODIMENTS

Figure 1:
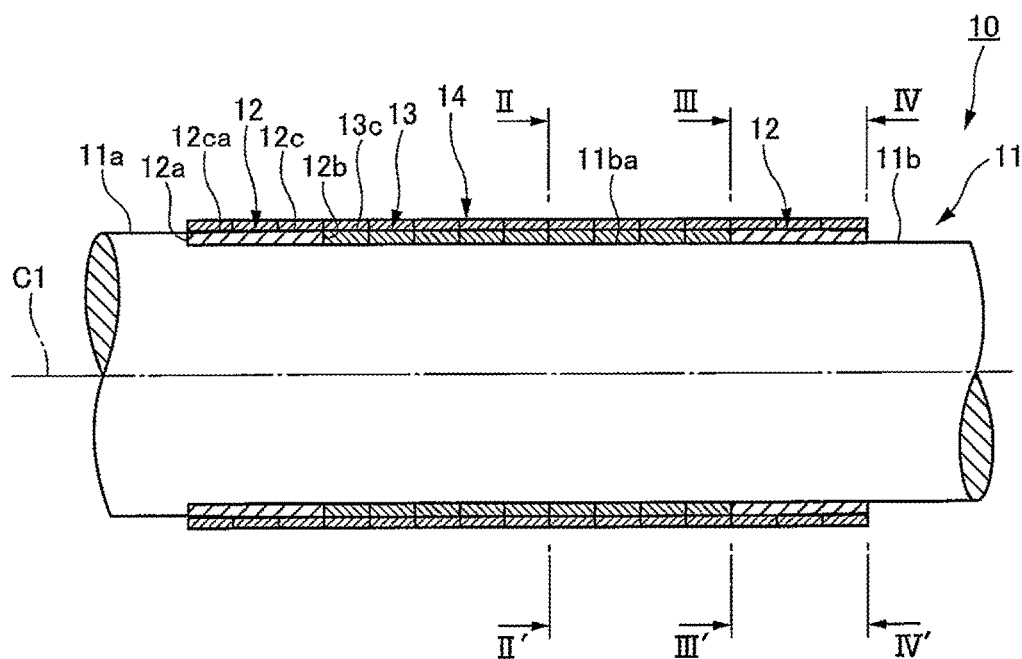
FIG. 1 is a cross-sectional view illustrating a rotor for a permanent magnet rotary electric machine according to a first embodiment of the present invention.
Figure 2:
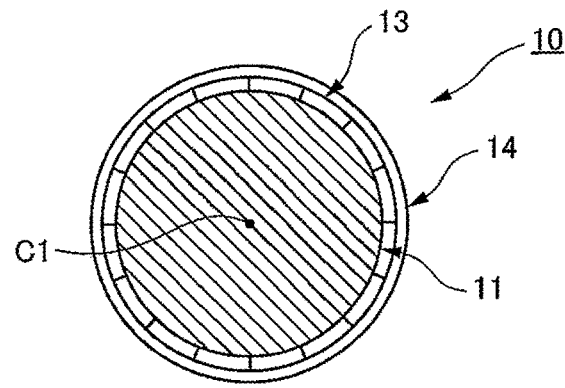
FIG. 2 is a cross-sectional view taken along the line II-II' in FIG. 1 as viewed in the direction of the arrows.
Figure 3:
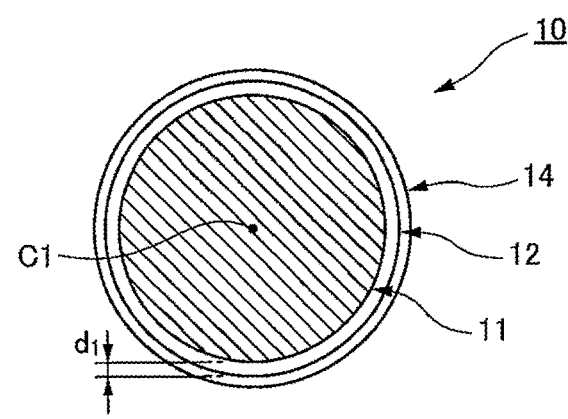
FIG. 3 is a cross-sectional view taken along the line III-III' in FIG. 1 as viewed in the direction of the arrows.
Figure 4:
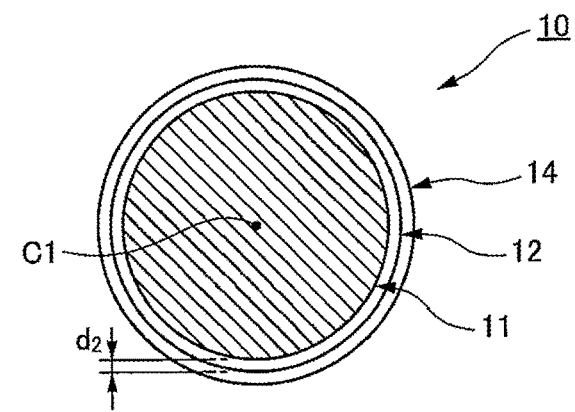
FIG. 4 is a cross-sectional view taken along the line IV-IV' in FIG. 1 as viewed in the direction of the arrows.

Embodiments of a rotor for a permanent magnet rotary electric machine according to the present invention are described below. However, the present invention is not limited to the following embodiments.

Embodiment 1

A rotor for a permanent magnet rotary electric machine according to a first embodiment of the present invention is described based on FIGS. 1 to 6. In FIGS. 1 to 5, C1 denotes the center axis (rotation axis) and, in FIG. 6, X denotes a press-fitting direction of retaining rings.

As illustrated in FIGS. 1 to 6, the rotor 10 for the permanent magnet rotary electric machine according to the embodiment includes a rotor shaft 11, multiple permanent magnets 13, and multiple retaining rings 14.

A radial cross section of the rotor shaft 11 has a circular shape. The rotor shaft 11 includes a large-diameter portion 11a and a small-diameter portion 11b. The large-diameter portion 11a has a larger shape than the small-diameter portion 11b in a radial direction. The small-diameter portion 11b has a smaller shape than the large-diameter portion 11a in the radial direction. A portion of the small-diameter portion 11b adjacent to the large-diameter portion 11a is formed to be a magnet attachment portion 11ba to which the permanent magnets 13 are attached.

The multiple permanent magnets 13 for forming the magnetic poles are arranged adjacent to one another in a circumferential direction and an axial direction of the rotor shaft 11, on an outer peripheral surface of the magnet attachment portion 11ba in the rotor shaft 11. The multiple permanent magnets 13 are arranged on the outer peripheral surface of the rotor shaft 11 such that outer peripheral surfaces 13c of the permanent magnets 13 form a flush surface.

Multiple retaining rings 14 which function as binding rings for fastening the permanent magnets 13 to the outer peripheral surface of the rotor shaft 11 are fitted to the outer peripheral surfaces 13c of the multiple permanent magnets 13 in the axial direction. Specifically, the multiple permanent magnets 13 are firmly fixed to the magnet attachment portion 11ba of the rotor shaft 11 by press-fitting the multiple retaining rings 14 from one end portion of the rotor shaft 11.

Each of the retaining rings 14 has a tubular shape and has a shape entirely covering one of the permanent magnets 13 arranged on the magnet attachment portion 11ba of the rotor shaft 11 in the axial direction of the rotor shaft 11. The multiple retaining rings 14 are formed to have such an inner diameter that there is provided a predetermined interference to an outer diameter of the multiple permanent magnets 13 disposed on the outer peripheral surface of the rotor shaft 11. Rings manufactured in a tubular shape by using carbon fiber reinforced plastic obtained by impregnating carbon fibers with synthetic resin such as epoxy resin are preferably used as the retaining rings 14.

The aforementioned rotor 10 for the permanent magnet rotary electric machine further includes a pair of end plates (ring guide portions) 12, 12 fixed by being shrink-fitted to portions of the outer peripheral surface of the rotor shaft 11 which are adjacent to the multiple permanent magnets 13 in the axial direction of the rotor shaft 11. The end plates 12, 12 restrict movement of the multiple permanent magnets 13 in the axial direction of the rotor shaft 11. Note that the multiple retaining rings 14 are fitted also to outer peripheral surfaces 12c, 12c of the end plates 12, 12.

Plates made of material which is non-magnetic and which can be subjected to shrink-fitting such as, for example, aluminum and stainless steel can be used as the end plates 12. The end plates 12 have a ring shape. Each end plate 12 is formed such that the thickness of the end plate 12 gradually decreases toward an end portion 12a not adjacent to the permanent magnets 13 in the axial direction, and the thickness d2 in the end portion 12a not adjacent to the permanent magnets 13 is smaller than the thickness d1 in an end portion 12b adjacent to the permanent magnets 13. Each end plate 12 has a tapered surface 12ca formed on the end portion 12a side of an outer peripheral surface 12c not adjacent to the permanent magnets 13 in the axial direction. Specifically, the outer peripheral surface 12c of the end plate 12 has the tapered surface 12ca having a shape which gradually becomes smaller toward the end portion 12a in the axial direction. Fixing the end plate 12 to the rotor shaft 11 by shrink-fitting it such that the other end portion 12b of the endplate 12 is arranged adjacent to the permanent magnets 13 causes the end portion 12a of the end plate 12 not adjacent to the permanent magnets 13 in the axial direction to be arranged opposite to the permanent magnets 13. Accordingly, when the retaining rings 14 are press-fitted, the inner peripheral surfaces of the retaining rings 14 come into surface contact with the outer peripheral surface 12c of the end plate 12, and the tapered surface 12ca of the end plate 12 gradually increases the diameters of the retaining rings 14.

The taper angle θ of the tapered surface 12ca in each end plate 12 is preferably within a range of 0.5 degrees to 1.5 degrees relative to the axial direction (press-fitting direction of the retaining rings 14). This is because, when the taper angle θ is within the aforementioned range, the diameters of the retaining rings 14 are gradually (gently) increased and instantaneous concentration of stress does not occur in the press-fitting of the retaining rings 14.

The outer peripheral surfaces 13c of the permanent magnets 13, the outer peripheral surfaces 12c of the endplates 12 on the end portion 12b sides, and an outer peripheral surface of the large-diameter portion 11a of the rotor shaft 11 are preferably subjected to machining such as polishing to have the same outer diameter dimension (height). This is because such machining can prevent the aforementioned surfaces from coming into point contact or linear contact with the inner peripheral surfaces of the retaining rings 14 due to outer diameter dimension errors and surely eliminate concentration of stress in the inner peripheral surfaces of the retaining rings 14 due to such contact in the press-fitting of the retaining rings 14.

Next, a method of manufacturing the aforementioned rotor 10 for the permanent magnet rotary electric machine is described.

Figure 5A:
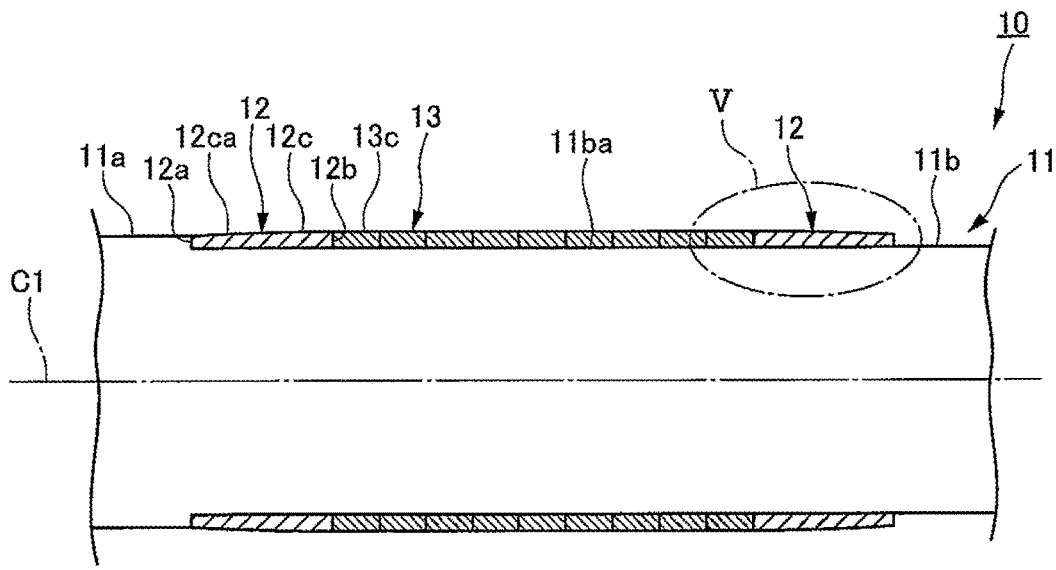
FIG. 5A is an explanatory view illustrating the rotor for the permanent magnet rotary electric machine before the press-fitting of the retaining rings.
Figure 5B:
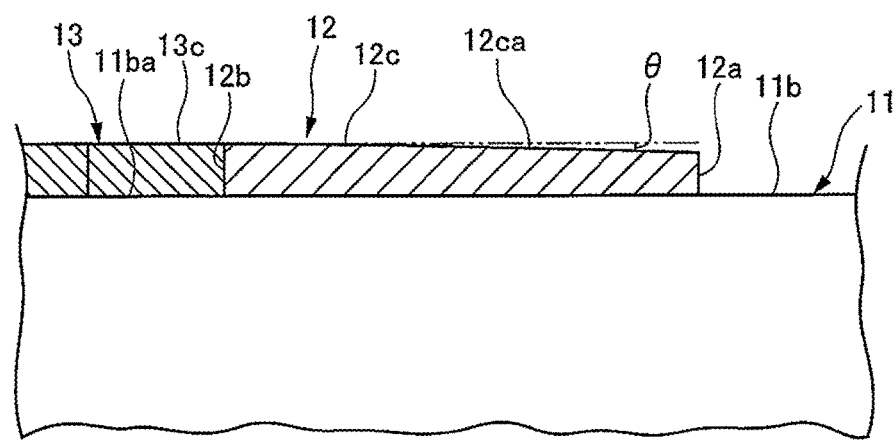
FIG. 5B is an enlarged view illustrating a portion surrounded by the line V in FIG. 5A.
Figure 6:
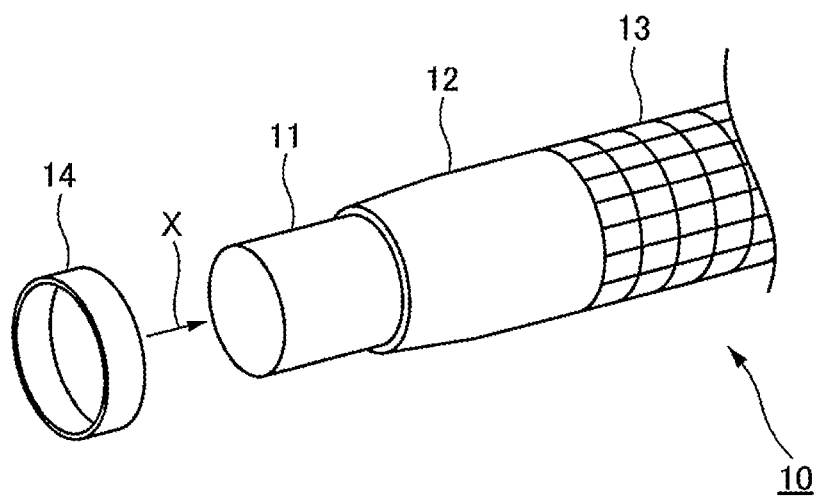
FIG. 6 is an explanatory view illustrating a state where the retaining rings included in the rotor for the permanent magnet rotary electric machine are press-fitted.

First, in the rotor 10 for the permanent magnet rotary electric machine before the press-fitting of the retaining rings 14, as illustrated in FIG. 5A, the permanent magnets 13 divided into multiple pieces in the axial direction are attached to the rotor shaft 11 and the non-magnetic end plates 12 shrink-fitted to the rotor shaft 11 are fixed respectively at both axial ends of the group of permanent magnets 13. In the end plate 12 (end plate 12 fixed on the right side in FIG. 1) fixed on the one end portion side of the rotor shaft 11, that is the upstream side in the press-fitting direction of the retaining rings 14, the end portion 12a not adjacent to the permanent magnets 13 in the axial direction is arranged on the upstream side in the press-fitting direction of the retaining rings 14. Moreover, in the end plate 12 (end plate 12 fixed on the left side in FIG. 1) fixed on the other end portion side of the rotor shaft 11, that is the downstream side in the press-fitting direction of the retaining rings 14, the end portion 12a not adjacent to the permanent magnets 13 in the axial direction is arranged on the downstream side in the press-fitting direction of the retaining rings 14.

In FIG. 5A, the retaining rings 14 are press-fitted one by one from the one end portion toward the other end portion of the rotor shaft 11 (from right to left in FIG. 5A). Note that, in FIG. 6, the retaining rings 14 are press-fitted one by one from left to right. The diameters of the retaining rings 14 are gradually increased along the tapered surface 12ca of the end plate 12 and the retaining rings 14 are press-fitted to be arranged at predetermined positions while bulging by an amount corresponding to the interference to fix the permanent magnets 13 and the end plates 12 at both ends. As illustrated in FIG. 1, the retaining rings 14 are set to a state fitted to the outer peripheral surfaces 13c, 12c of the permanent magnets 13 and the end plates 12. Note that, it is possible to apply lubricant to the outer peripheral surfaces 12c, 13c of the end plates 12 and the permanent magnets 13 to reduce load in the press-fitting and press-fit the retaining rings 14 with the friction force reduced.

Since the retaining rings 14 are press-fitted with the diameter thereof being gradually increased along the tapered surface 12ca of the end plate 12, stress is less likely to be concentrated in the inner peripheral surfaces of the retaining rings 14 and a decrease in the strength of the retaining rings 14 can be suppressed.

As described above, in the embodiment, the rotor 10 includes: the multiple permanent magnets 13 arranged adjacent to one another in the axial direction and the circumferential direction, on the outer peripheral surface of the rotor shaft 11; the retaining rings 14 press-fitted to the outside of the permanent magnets 13 and the outside of the end plates 12 from the one end portion side of the rotor shaft 11 to retain the permanent magnets 13 on the rotor shaft 11; and the end plates 12 forming a ring guide portion provided adjacent to the multiple permanent magnets 13 in the axial direction of the rotor shaft 11, the ring guide portion configured to come into surface contact with the inner peripheral surfaces of the press-fitted retaining rings 14 and guide the retaining rings 14 toward the permanent magnets 13 while gradually increasing the diameters of the retaining rings 14 as the retaining rings 14 are moved from the one end portion side of the rotor shaft 11 toward the other end portion side of the rotor shaft 11. Accordingly, the diameters of the retaining rings 14 are gradually increased instead of being instantaneously increased when the retaining rings 14 are press-fitted. Then, when the retaining rings 14 are further-deeply press-fitted, the retaining rings 14 are smoothly moved from the outer peripheral surface 12c of the end plate 12 to the outer peripheral surfaces 13c of the permanent magnets 13 with the diameters of the retaining rings 14 increased. Accordingly, axial end portions (corner portions) of the permanent magnets 13 do not come into point contact or linear contact with the inner peripheral surfaces of the retaining rings 14, and the concentration of stress in the inner peripheral surfaces of the retaining rings 14 due to such contact can be eliminated. In this configuration, there is no need to process the permanent magnets and the retaining rings into special shapes and it is only necessary to provide the end plate 12. Accordingly, it is possible to suppress the concentration of stress in the retaining rings 14 in the press-fitting while retaining electrical characteristics, in a simple configuration.

The diameter of the outer peripheral surface 12c of each end plate 12 gradually decreases from the permanent magnet 13 side toward the opposite side in the axial direction of the rotor shaft 11. This causes the inner peripheral surfaces of the press-fitted retaining rings 14 and the tapered surface 12ca of the outer peripheral surface 12c of the end plate 12 to come into surface contact and also causes the diameters of the retaining rings 14 to be gradually increased instead of being instantaneously increased. In this configuration, there is no need to process the permanent magnets and the retaining rings into special shapes and it is only necessary to process the outer peripheral surface 12c of the end plate 12. Accordingly, it is possible to surely suppress the concentration of stress in the retaining rings 14 in the press-fitting while retaining the electrical characteristics, in a simple configuration.

The endplates 12 are made of aluminum or stainless steel. Accordingly, the tapered surface 12ca can be easily formed on the outer peripheral surface 12c of each end plate 12. This can suppress an increase in the manufacturing cost.

The height of the outer peripheral surface 12c of each end plate 12 on the other end portion 12b side in the axial direction is the same as the height of the outer peripheral surfaces 13c of the permanent magnets 13. Accordingly, when the retaining rings 14 are press-fitted, the retaining rings 14 can be smoothly moved from the outer peripheral surface 12c of the end plate 12 to the outer peripheral surfaces 13c of the permanent magnets 13.

Embodiment 2

Figure 7:
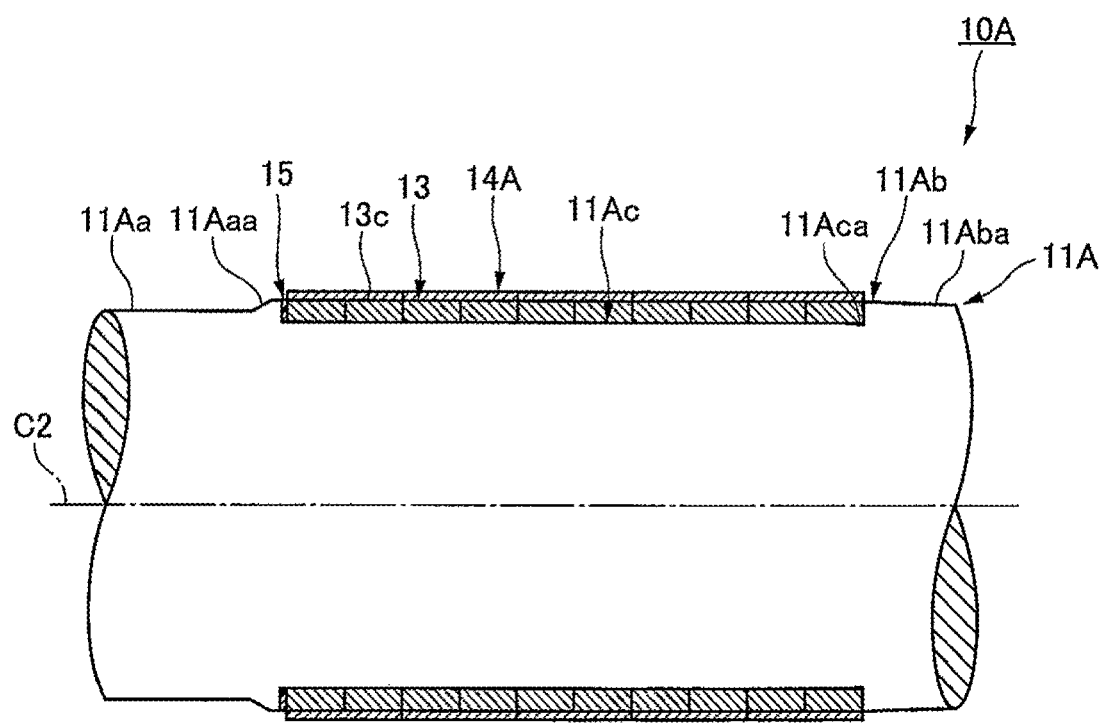
FIG. 7 is a cross-sectional view illustrating a rotor for a permanent magnet rotary electric machine according to a second embodiment of the present invention.
Figure 8:
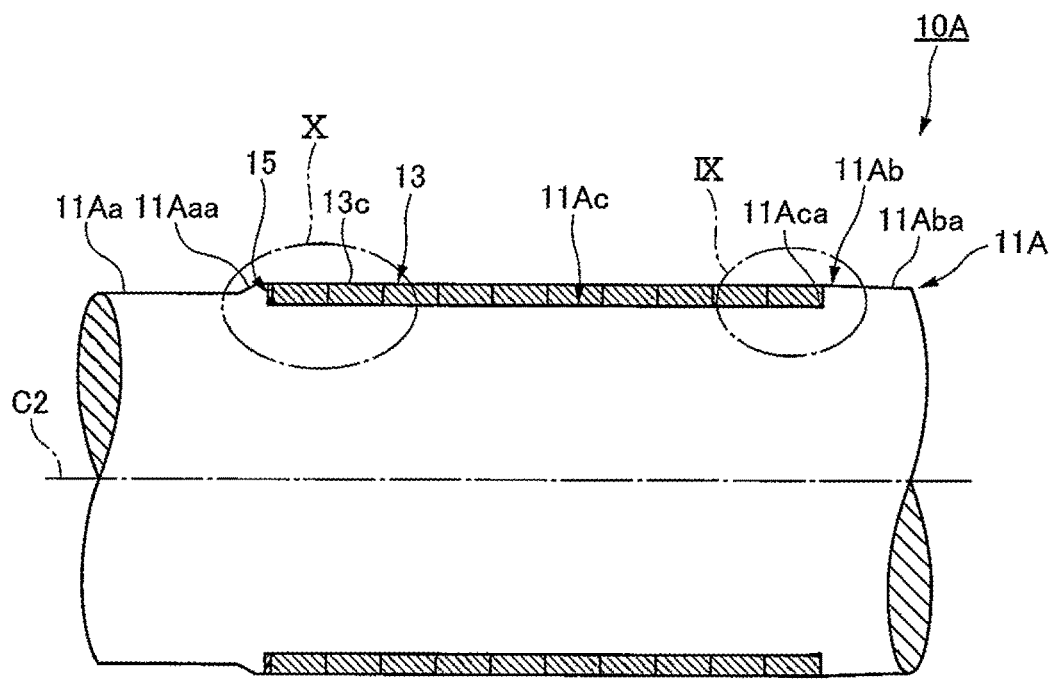
FIG. 8 is an explanatory view illustrating a state before the retaining rings included in the rotor for the permanent magnet rotary electric machine are press-fitted
Figure 9:
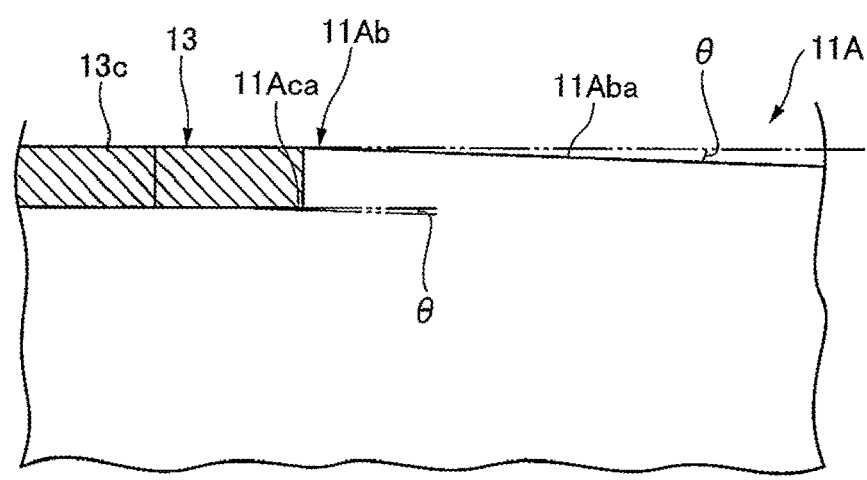
FIG. 9 is an enlarged view of a portion surrounded by the line IX in FIG. 8.
Figure 10:
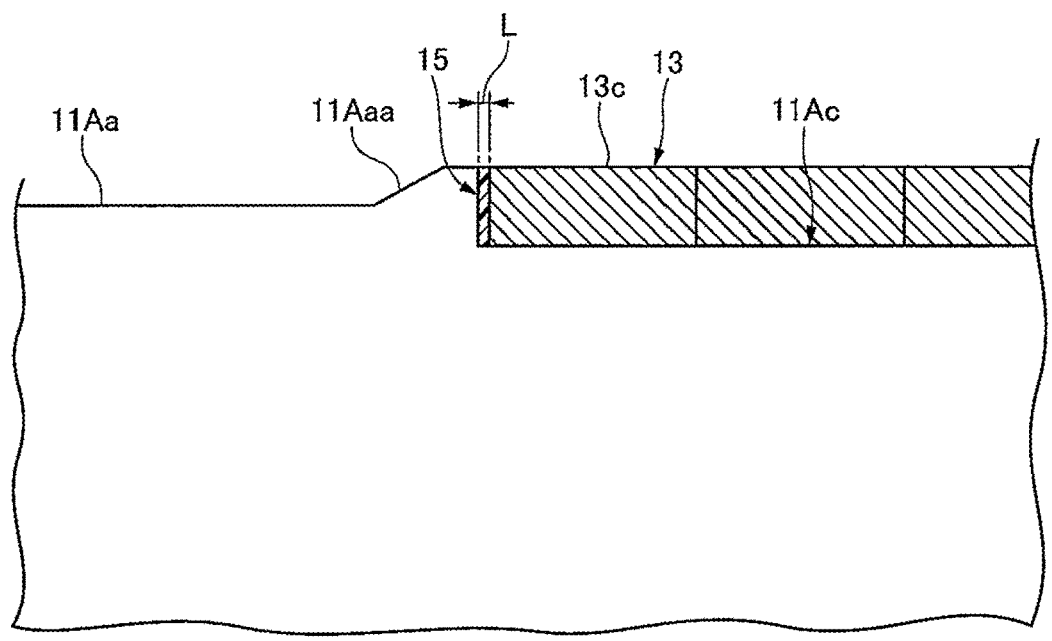
FIG. 10 is an enlarged view of a portion surrounded by the line X in FIG. 8.

A rotor for a permanent magnet rotary electric machine according to a second embodiment of the present invention is described based on FIGS. 7 to 10. In FIGS. 7 and 8, C2 denotes the center axis (rotation axis).

As illustrated in FIGS. 7 to 10, the rotor 10A in the permanent magnet rotary electric machine according to the embodiment includes a rotor shaft 11A, the multiple permanent magnets 13, and multiple retaining rings 14A.

A radial cross section of the rotor shaft 11A has a circular shape. The rotor shaft 11A includes a first large-diameter portion 11Aa and a second large-diameter portion (ring guide portion) 11Ab. The second large-diameter portion 11Ab is provided on one end portion side of the rotor shaft 11A, that is the upstream side in a press-fitting direction of the retaining rings 14A. The first large-diameter portion 11Aa is provided on the other end portion side of the rotor shaft 11A, that is the downstream side in the press-fitting direction of the retaining rings 14A. A portion between the first large-diameter portion 11Aa and the second large-diameter portion 11Ab in the axial direction of the rotor shaft 11A is formed to be a magnet attachment portion 11Ac to which the permanent magnets 13 are attached.

The first large-diameter portion 11Aa has such a size that the surface thereof is arranged outside the magnet attachment portion 11Ac in the radial direction and inside the outer peripheral surfaces 13c of the permanent magnets 13 attached to the magnet attachment portion 11Ac in the radial direction. The first large-diameter portion 11Aa includes a flange portion 11Aaa having a shape protruding outward in the radial direction of the rotor shaft 11A and extending over the entire rotor shaft 11A in the circumferential direction. The height of a top portion of the flange portion 11Aaa is substantially the same as the height of the permanent magnets 13 attached to the magnet attachment portion 11Ac. A gap L is provided between the flange portion 11Aaa and the permanent magnets 13 disposed at the left end in FIG. 7 and the gap L is filled with adhesive 15. The contact between the flange portion 11Aaa and the permanent magnets 13 are thereby avoided. The second large-diameter portion 11Ab has a shape larger than the magnet attachment portion 11Ac and extends outward in the radial direction beyond the magnet attachment portion 11Ac.

The multiple permanent magnets 13 for forming the magnetic poles are arranged adjacent to one another in the circumferential direction and the axial direction of the rotor shaft 11A, on an outer peripheral surface of the magnet attachment portion 11Ac in the rotor shaft 11A. The multiple permanent magnets 13 are arranged on the outer peripheral surface of the rotor shaft 11A such that the outer peripheral surfaces 13c of the permanent magnets 13 form a flush surface.

The multiple retaining rings 14A which function as binding rings for fastening the permanent magnets 13 to the outer peripheral surface of the rotor shaft 11A are fitted to the outer peripheral surfaces 13c of the multiple permanent magnets 13 in the axial direction. Specifically, the multiple permanent magnets 13 are firmly fixed to the magnet attachment portion 11Ac of the rotor shaft 11A by press-fitting the multiple retaining rings 14A from the one end portion of the rotor shaft 11A.

The retaining rings 14A are the same as the aforementioned retaining rings 14, except for their shapes. Each of the retaining rings 14A has a tubular shape and has a shape entirely covering multiple (two in the illustrated example) permanent magnets 13 arranged on the magnet attachment portion 11Ac of the rotor shaft 11A in the axial direction of the rotor shaft 11A. The multiple retaining rings 14A are formed to have such an inner diameter that there is provided a predetermined interference to the outer diameter of the multiple permanent magnets 13 disposed on the outer peripheral surface of the rotor shaft 11A.

An outer peripheral surface of the second large-diameter portion 11Ab in the aforementioned rotor shaft 11A includes a tapered surface 11Aba having such a shape that the diameter of the outer peripheral surface of the second large-diameter portion 11Ab gradually decreases from the permanent magnet 13 side toward the opposite side in the axial direction of the rotor shaft 11A. The inner peripheral surfaces of the press-fitted retaining rings 14A thereby come into surface contact with the tapered surface 11Aba which is the outer peripheral surface of the second large-diameter portion 11Ab, and the tapered surface 11Aba gradually increases the diameters of the retaining rings 14A as the retaining rings 14A are moved from the one end portion side of the rotor shaft 11A to the other end portion side of the rotor shaft 11A.

Note that, as in the first embodiment, the taper angle $\theta$ of the tapered surface 11Aba in the second large-diameter portion 11Ab is preferably set within a range of 0.5 degrees to 1.5 degrees relative to the axial direction (press-fitting direction of the retaining rings 14A). This is because, when the taper angle $\theta$ is within the aforementioned range, the diameters of the retaining rings 14 are gradually (gently) increased and instantaneous concentration of stress does not occur in the press-fitting of the retaining rings 14A.

The outer peripheral surfaces 13c of the permanent magnets 13 and an end portion of the outer peripheral surface of the second large-diameter portion 11Ab adjacent to the magnet attachment portion 11Ac are preferably subjected to machining such as polishing to have the same outer diameter dimension (height). This is because such machining can prevent the aforementioned surfaces from coming into point contact or linear contact with the inner peripheral surfaces of the retaining rings 14A due to outer diameter dimension errors and surely eliminate concentration of stress in the inner peripheral surfaces of the retaining rings 14A due to such contact in the press-fitting of the retaining rings 14A.

A tapered surface 11Aca is formed in a portion of the magnet attachment portion 11Ac adjacent to the second large-diameter portion 11Ab, and the taper angle $\theta$ of the tapered surface 11Aca is the same as the taper angle $\theta$ of the tapered surface 11Aba.

The second large-diameter portion 11Ab and the flange portion 11Aaa of the first large-diameter portion 11Aa restrict the movement of the multiple permanent magnets 13, attached to the magnet attachment portion 11Ac, in the axial direction of the rotor shaft 11A.

In the embodiment, the second large-diameter portion 11Ab forms the ring guide portion.

Next, a method of manufacturing the aforementioned rotor 10A for the permanent magnet rotary electric machine is described.

First, in the rotor 10A for the permanent magnet rotary electric machine before the press-fitting of the retaining rings 14A, as illustrated in FIG. 8, the permanent magnets 13 divided into multiple pieces in the axial direction are attached to the magnet attachment portion 11Ac provided between the flange portion 11Aaa of the first large-diameter portion 11Aa and the second large-diameter portion 11Ab in the axial direction of the rotor shaft 11A. The rotor shaft 11A is arranged such that the second large-diameter portion 11Ab is provided on the one end portion side of the rotor shaft 11A, that is the upstream side in the press-fitting direction of the retaining rings 14A. The gap between the flange portion 11Aaa and the permanent magnets 13 attached on the most downstream side in the press-fitting direction of the retaining rings 14A is filled with the adhesive 15.

In FIG. 8, the retaining rings 14A are press-fitted one by one from the one end portion toward the other end portion of the rotor shaft 11A (from right to left in FIG. 8). The diameters of the retaining rings 14A are gradually increased along the tapered surface 11Aba of the second large-diameter portion 11Ab and the retaining rings 14A are press-fitted to be arranged at predetermined positions while bulging by an amount corresponding to the interference to fix the permanent magnets 13. As illustrated in FIG. 7, the retaining rings 14A are set to a state fitted to the outer peripheral surfaces 13c of the permanent magnets 13. Note that it is possible to apply lubricant to the second large-diameter portion 11Aba and the outer peripheral surfaces 13c of the permanent magnets 13 to reduce load in the press-fitting and press-fit the retaining rings 14A with the friction force reduced.

Since the retaining rings 14A are press-fitted with the diameter thereof being gradually increased along the tapered surface 11Aba of the second large-diameter portion 11Ab, stress is less likely to be concentrated in the inner peripheral surfaces of the retaining rings 14A and a decrease in the strength of the retaining rings 14A can be suppressed. Moreover, in the permanent magnets 13 attached on the most upstream side in the press-fitting direction of the retaining rings 14A on the one end portion side of the rotor shaft 11A, the outer peripheral surfaces 13c are arranged to be capable of tilting toward the center axis C2 of the rotor shaft 11A while extending toward the upstream side in the press-fitting direction of the retaining rings 14A in the axial direction of the rotor shaft 11A. Accordingly, movement of the retaining rings 14A from the second large-diameter portion 11Ab to the permanent magnets 13 attached on the upstream side in the press-fitting direction of the retaining rings 14A can be made smoother than in the case where the permanent magnets do not tilt.

As described above, in the embodiment, the rotor 10 includes: the multiple permanent magnets 13 arranged adjacent to one another in the axial direction and the circumferential direction, on the outer peripheral surface of the rotor shaft 11A; the retaining rings 14A press-fitted to the outside of the multiple permanent magnets 13 from the one end portion side of the rotor shaft 11A to retain the multiple permanent magnets 13 on the rotor shaft 11A; and the second large-diameter portion 11Ab forming a ring guide portion provided adjacent to the multiple permanent magnets 13 in the axial direction of the rotor shaft 11A, the ring guide portion configured to come into surface contact with the inner peripheral surfaces of the press-fitted retaining rings 14A and guide the retaining rings 14A toward the permanent magnets 13 while gradually increasing the diameters of the retaining rings 14A as the retaining rings 14 are moved from the one end portion side of the rotor shaft 11A toward the other end portion side of the rotor shaft 11A. Accordingly, the diameters of the retaining rings 14 are gradually increased instead of being instantaneously increased when the retaining rings 14 are press-fitted. Then, when the retaining rings 14A are further-deeply press-fitted, the retaining rings 14A are smoothly moved from the outer peripheral surface of the second large-diameter portion 11Ab to the outer peripheral surfaces 13c of the permanent magnets 13 with the diameters of the retaining rings 14A increased. Accordingly, the axial end portions (corner portions) of the permanent magnets 13 do not come into point contact or surface contact with the inner peripheral surfaces of the retaining rings 14A, and the concentration of stress in the inner peripheral surfaces of the retaining rings 14A due to such contact can be eliminated. In this configuration, there is no need to process the permanent magnets and the retaining rings into special shapes and it is only necessary to provide the second large-diameter portion 11Ab. Accordingly, it is possible to suppress concentration of stress in the retaining rings 14A in the press-fitting while retaining electrical characteristics, in a simple configuration.

The diameter of the outer peripheral surface of the second large-diameter portion 11Ab gradually decreases from the permanent magnet 13 side toward the opposite side in the axial direction of the rotor shaft 11A. This causes the inner peripheral surfaces of the press-fitted retaining rings 14A and the tapered surface 11Aba of the outer peripheral surface of the second large-diameter portion 11Ab to come into surface contact and also causes the diameters of the retaining rings 14A to be gradually increased instead of being instantaneously increased. In this configuration, there is no need to process the permanent magnets and the retaining rings into special shapes and it is only necessary to process the outer peripheral surface of the second large-diameter portion 11Ab. Accordingly, it is possible to surely suppress the concentration of stress in the retaining rings 14A in the press-fitting while retaining the electrical characteristics, in a simple configuration. Since manufacturing of the end plates is unnecessary, it is possible to eliminate the manufacturing cost of the end plates and eliminate the working step of shrink-fitting the end plates to the rotor shaft 11A and the working steps performed before this step. Moreover, as illustrated in FIG. 7, when the end plates are eliminated, insertion of the retaining rings supporting the end plates at both ends in the first embodiment also becomes unnecessary, and the number of retaining rings used can be reduced.

The diameter of the portion adjacent to the second large-diameter portion 11Ab in the portion of the outer peripheral surface of the rotor shaft 11A on which the permanent magnets 13 are disposed gradually decreases toward the second large-diameter portion 11Ab forming the ring guide portion in the axial direction of the rotor shaft 11A. Accordingly, the press-fitted retaining rings 14A are more smoothly moved from the second large-diameter portion 11Ab to the permanent magnets 13.

The rate of gradual decrease of the diameter (taper angle $\theta$ of the tapered surface 11Aca) in the portion adjacent to the second large-diameter portion 11Ab in the portion of the outer peripheral surface of the rotor shaft 11A on which the permanent magnets 13 are disposed is the same as the rate of gradual decrease of the diameter (taper angle $\theta$ of the tapered surface 11Aba) of the outer peripheral surface in the second large-diameter portion 11Ab in the axial direction of the rotor shaft 11A. Accordingly, the inner peripheral surfaces of the press-fitted retaining rings 14A more surely come into surface contact with the outer peripheral surfaces 13c of the permanent magnets 13 and the concertation of stress in the retaining rings 14A in the press-fitting can be more surely suppressed.

In the second large-diameter portion 11Ab, the height of the outer peripheral surface on the end portion side adjacent to the permanent magnets 13 in the axial direction is the same as the height of the outer peripheral surfaces 13c of the permanent magnets 13. Accordingly, when the retaining rings 14A are press-fitted, the retaining rings 14A can be smoothly moved from the outer peripheral surface of the second large-diameter portion 11Ab to the outer peripheral surfaces 13c of the permanent magnets 13.

Embodiment 3

Figure 11A:
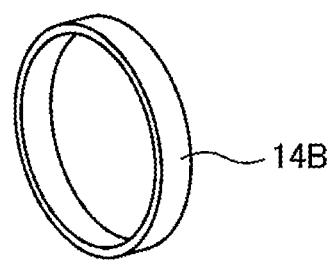
FIG. 11A is a cross-sectional view illustrating a retaining ring included in a rotor for a permanent magnet rotary electric machine according to a third embodiment of the present invention.

As a third embodiment of the present invention, description is given of a retaining ring 14B (see FIG. 11A) which can be utilized as the retaining rings used in the first and second embodiments.

A method of manufacturing the retaining ring 14B is described. First, a carbon fiber is continuously wound in one way in the circumferential direction by using a filament winding method until a width of a ring reaches a predetermined ring width (specified axial width). In this case, a start point of the winding of the carbon fiber is arranged on the inner peripheral side and an end point of the winding of the carbon fiber is arranged on the outer peripheral side. The carbon fiber wound into a cylindrical shape as described above is impregnated with synthetic resin such as epoxy resin and the retaining ring 14B is thereby manufactured. In other words, the retaining ring 14B is a so-called "continuously-wound product" made of carbon fiber reinforced plastic (CFRP).

A rotor for a permanent magnet rotary electric machine is formed by press-fitting the retaining ring 14B to a rotor shaft on which permanent magnets are disposed. Since the rotor rotates at high speed (for example, 10,000 min$^{-1}$ or more), peel force generated by contact with air acts on an outer peripheral surface of the retaining ring 14B. This retaining ring 14B has only one end point of the winding of the carbon fiber on the outer peripheral surface. Accordingly, there is only one start point for peeling caused by the peel force generated by air, which is the end point of the winding of the carbon fiber, and the number of start points for peeling can be minimized. Thus, the original strength of the carbon fiber can be sufficiently provided in the retaining ring 14B. Hence, the retaining ring 14B which is the continuously-wound product is a member with high reliability which can withstand large press-fitting load acting thereon.

Figure 11B:
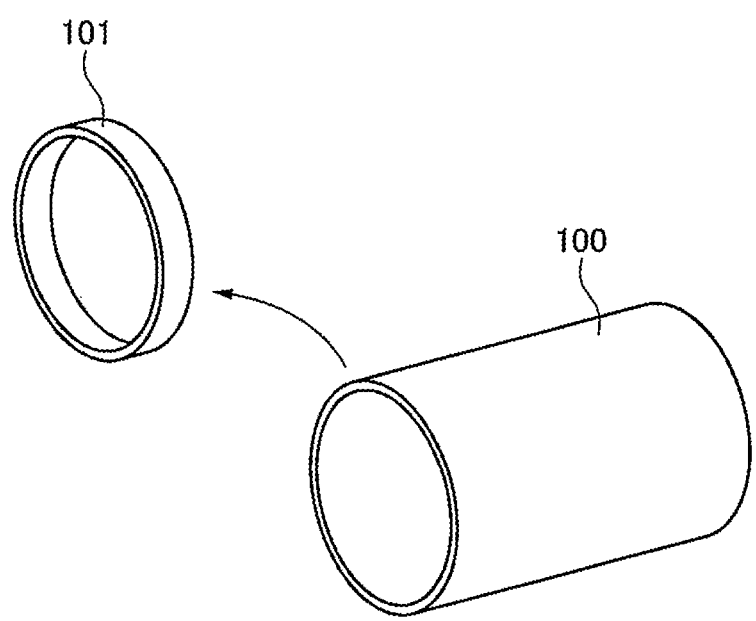
FIG. 11B is an explanatory view illustrating a manufacturing state of a conventional retaining ring.

A conventional retaining ring 101 is described with reference to FIG. 11B as a comparative example. A method of manufacturing the retaining ring 101 is described. First, a carbon fiber is wound by using the filament winding method and a cylindrical member with a long dimension in the axial direction is formed. Then, the cylindrical member is impregnated with synthetic resin to produce a carbon fiber plastic (CFRP) ring member 100. The ring member 100 is cut into round slices with a predetermined ring width (specified axial width) to manufacture the CFRP retaining ring 101. The conventional retaining ring 101 is a so-called "cut product."

There are many cuts of the carbon fiber on an end surface (cut surface) of the CFRP retaining ring 101. Accordingly, in a ring burst test in which the retaining ring 101 was destroyed by applying internal pressure from the inner diameter side toward the outer diameter side of the retaining ring 101, there was observed a mode in which the carbon fiber on the end surface (cut surface) of the retaining ring 101 peeled off first and the peeling progressed from this point, leading to destruction. In other words, it was found that the strength of the carbon fiber was not sufficiently provided. Accordingly, in the retaining ring 101 manufactured by dividing the ring member 100 into multiple pieces in the axial direction as described above, the number of points where the destruction of the retaining ring 101 may start is increased and the retaining ring 101 is not preferable for use in a high-speed rotating body.

The ring burst test in which the retaining rings were destroyed by applying internal pressure from the inner diameter side toward the outer diameter side of the retaining rings was performed to compare the destruction mode of the retaining rings 101 being the cut products and the destruction mode of the retaining rings 14B being the continuously-wound products. Three out of the five cut products (retaining rings 101) were destroyed by "peeling" of the carbon fiber, while all five continuously-wound products (retaining rings 14B) were destroyed by "breaking" of the carbon fiber. The strength (average value of five products) of the continuously-wound products (retaining rings 14B) against destruction was increased by 10% relative to that of the cut-products (retaining rings 101).

Embodiment 4

Figure 12A:
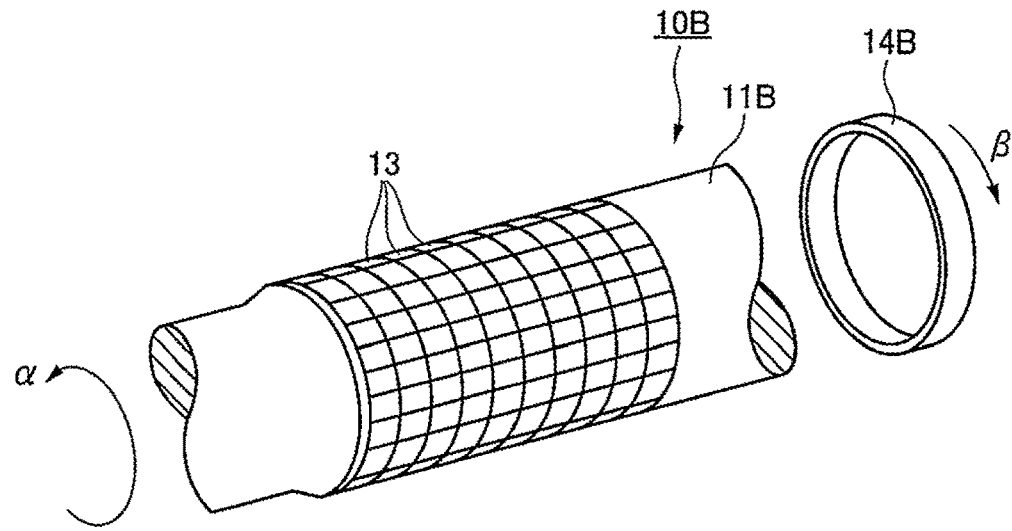
FIG. 12A is an explanatory view illustrating a rotor for a permanent magnet rotary electric machine according to a fourth embodiment of the present invention in a state before attachment of the retaining rings.
Figure 12B:
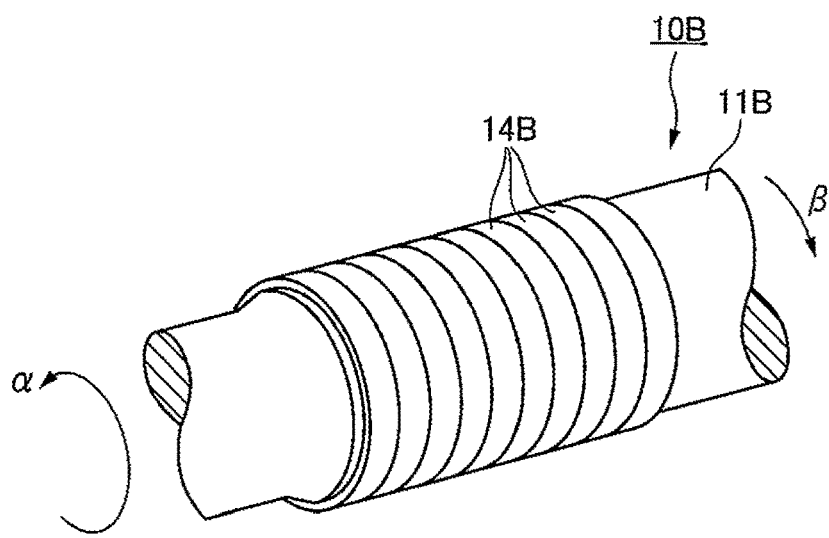
FIG. 12B is an explanatory view illustrating the rotor for the permanent magnet rotary electric machine according to the fourth embodiment of the present invention in a state after the attachment of the retaining rings.

Next, a rotor 10B including the retaining rings 14B of the third embodiment is described as a fourth embodiment of the present invention with reference to FIGS. 12A and 12B.

The rotor 10B is a rotor in which the permanent magnets 13 are arranged on a circumferential surface of a rotor shaft 11B and the retaining rings 14B are press-fitted onto the outer peripheral surfaces of the permanent magnets 13. Note that FIG. 12A illustrates a state before the press-fitting of the retaining rings 14B and FIG. 12B illustrates a state after the press-fitting of the retaining rings 14B.

In this embodiment, the rotor shaft 11B rotates in a direction denoted by α in the drawings. Moreover, in each of the retaining rings 14B, the carbon fiber is wound in a direction denoted by β in the drawings with the start point of the winding provided on the inner peripheral side and the end point of the winding provided on the outer peripheral side.

A main point of this embodiment is that the retaining rings 14B are provided on the rotor shaft 11B such that the winding direction β of the carbon fiber in the retaining rings 14B is opposite to the rotating direction α of the rotor shaft 11b.

When the rotor 10B provided with the retaining rings 14B rotates, the outer peripheral surfaces of the retaining rings 14B receive peel force generated by air resistance caused by wind traveling at high speed of several hundred m/s. In this case, since the rotating direction α of the rotor shaft 11b and the winding direction β of the carbon fiber in the retaining rings 14B are opposite to each other, the end point of the winding of the carbon fiber is less likely to peel off even when the end point receives the peel force generated by air resistance.

Modified examples of the embodiments are described below.

In the aforementioned first embodiment, description has been given by using the rotor 10 of the permanent magnet rotary electric machine which includes: the multiple permanent magnets 13 arranged adjacent to one another in the circumferential direction and the axial direction, on the outer periphery of the rotor shaft 11; and the paired end plates 12 arranged adjacent to the multiple permanent magnets 13 in the axial direction of the rotor shaft 11 and in which the tapered surfaces 12ca are formed respectively on the outer peripheral surfaces 12c of the paired end plates 12. However, there may be used a rotor for a permanent magnet rotary electric machine which includes: the multiple permanent magnets 13 arranged adjacent to one another in the circumferential direction and the axial direction, on the outer periphery of the rotor shaft 11; and the paired end plates 12 arranged adjacent to the multiple permanent magnets 13 in the axial direction of the rotor shaft 11 and in which the tapered surface is formed on the outer peripheral surface 12c of one of the end plates 12. Such a rotor for a permanent magnet rotary electric machine also provides operations and effects similar to those of the rotor 10 of the permanent magnet rotary electric machine described above. Moreover, the permanent magnets are not limited to the multiple permanent magnets 13 arranged adjacent to one another in the circumferential direction and the axial direction, and any permanent magnet arranged on the outer periphery of the rotor shaft can provide similar operations and effects.

In the aforementioned second embodiment, description is given by using the rotor 10A of the rotary electric machine including the rotor shaft 11A having the magnet attachment portion 11Ac provided with the tapered surface 11Aca. However, there may be used a rotor of a rotary electric machine including a rotor shaft having a magnet attachment portion provided with no tapered surface 11Aca.

REFERENCE SIGNS LIST 10, 10A, 10B rotor of permanent magnet rotary electric machine rotor shaft
11a large-diameter portion
11b small-diameter portion
11ba magnet attachment portion
11A, 11B rotor shaft
11Aa first large-diameter portion
11Aaa flange portion
11Ab second large-diameter portion (ring guide portion)
11Aba tapered surface
11Ac magnet attachment portion
11Aca tapered surface
12 end plates (ring member, ring guide portion)
12a end portion
12b end portion
12c outer peripheral surface
12ca tapered surface
13 permanent magnet
13c outer peripheral surface
14, 14A, 14B retaining ring (CFRP ring)
15 adhesive
C1, C2 center axis (rotation axis)
d1 thickness of end plate d2 thickness of end plate
L gap
X press-fitting direction of retaining rings
θ taper angle

The invention claimed is:

1. A rotor for a permanent magnet rotary electric machine, the rotor comprising:
   a plurality of permanent magnets disposed on an outer peripheral surface of a rotor shaft to form a flush outer surface;
   a plurality of retaining rings having the same inner diameter and press-fitted onto the flush outer surface of the plurality of permanent magnets from one end portion side of the rotor shaft to retain the plurality of permanent magnets on the rotor shaft; and
   a ring guide portion provided adjacent to at least one permanent magnet of the plurality of permanent magnets in an axial direction of the rotor shaft, the ring guide portion configured to come into surface contact with an inner peripheral surface of at least one retaining ring of the plurality of retaining rings and guide the at least one retaining ring toward the plurality of permanent magnets while gradually increasing a diameter of the at least one retaining ring as the at least one retaining ring is moved from the one end portion side of the rotor shaft toward another end portion side of the rotor shaft.

2. The rotor for a permanent magnet rotary electric machine according to claim 1, wherein
   the ring guide portion is a ring member fixed to the outer peripheral surface of the rotor shaft, and
   a diameter of an outer peripheral surface of the ring member gradually decreases from the permanent magnet side toward the opposite side in the axial direction of the rotor shaft.

3. The rotor for a permanent magnet rotary electric machine according to claim 2, wherein the ring member is a non-magnetic body.

4. The rotor for a permanent magnet rotary electric machine according to claim 1, wherein
   a height of an outer peripheral surface of the ring guide portion in an end portion adjacent to the at least one permanent magnet in the axial direction is the same as a height of an outer peripheral surface of the at least one permanent magnet.

5. The rotor for a permanent magnet rotary electric machine according to claim 1, wherein
   each retaining ring of the plurality of retaining rings is molded from carbon fiber reinforced plastic obtained by continuously winding a carbon fiber in one way in the circumferential direction and impregnating the carbon fiber with synthetic resin.

6. The rotor for a permanent magnet rotary electric machine according to claim 5, wherein
   a start point of winding of the carbon fiber is disposed on an inner peripheral side of a retaining ring and an end point of the winding of the carbon fiber is disposed on an outer peripheral side of the associated retaining ring, and
   a retaining ring is press-fitted to the rotor shaft such that a winding direction of the carbon fiber is opposite to a rotating direction of rotor shaft.

7. The rotor for a permanent magnet rotary electric machine according to claim 1, wherein the rotor shaft has a large-diameter portion, which is provided on the one end portion side of the rotor shaft and which has a larger diameter than a portion of the outer peripheral surface of the rotor shaft on which the associated permanent magnet is disposed; and
   wherein the ring guide portion is the large-diameter portion.

8. The rotor for a permanent magnet rotary electric machine according to claim 7, wherein a diameter of an outer peripheral surface of the large-diameter portion gradually decreases from the permanent magnet side toward the opposite side in the axial direction of the rotor shaft.

9. The rotor for a permanent magnet rotary electric machine according to claim 8, wherein a diameter of a portion adjacent to the large-diameter portion in the portion of the outer peripheral surface of the rotor shaft on which the associated permanent magnet is disposed gradually decreases toward the ring guide portion side in the axial direction of the rotor shaft.

10. The rotor for a permanent magnet rotary electric machine according to claim 9, wherein a rate of gradual decrease of the diameter in the portion adjacent to the large-diameter portion in the portion of the outer peripheral surface of the rotor shaft on which the associated permanent magnet is disposed is the same as a rate of gradual decrease of the diameter of the outer peripheral surface in the large-diameter portion in the axial direction of the rotor shaft.

11. A rotor for a permanent magnet rotary electric machine, the rotor comprising:
    a permanent magnet disposed on an outer peripheral surface of a rotor shaft;
    a retaining ring press-fitted to an outside of the permanent magnet from one end portion side of the rotor shaft to retain the permanent magnet on the rotor shaft; and
    a ring guide portion provided adjacent to the permanent magnet in an axial direction of the rotor shaft, the ring guide portion configured to come into surface contact with an inner peripheral surface of the press-fitted retaining ring and guide the retaining ring toward the permanent magnet while gradually increasing a diameter of the retaining ring as the retaining ring is moved from the one end portion side of the rotor shaft toward another end portion side of the rotor shaft;
    wherein the rotor shaft has a large-diameter portion which is provided on the one end portion side of the rotor shaft and which has a larger diameter than a portion of the outer peripheral surface of the rotor shaft on which the permanent magnet is disposed,
    wherein the ring guide portion is the large-diameter portion, and
    wherein a diameter of an outer peripheral surface of the large-diameter portion gradually decreases from the permanent magnet side toward the opposite side in the axial direction of the rotor shaft.

12. The rotor for a permanent magnet rotary electric machine according to claim 11, wherein
    a diameter of a portion adjacent to the large-diameter portion in the portion of the outer peripheral surface of the rotor shaft on which the permanent magnet is disposed gradually decreases toward the ring guide portion side in the axial direction of the rotor shaft.

13. The rotor for a permanent magnet rotary electric machine according to claim 12, wherein
    a rate of gradual decrease of the diameter in the portion adjacent to the large-diameter portion in the portion of the outer peripheral surface of the rotor shaft on which the permanent magnet is disposed is the same as a rate of gradual decrease of the diameter of the outer peripheral surface in the large-diameter portion in the axial direction of the rotor shaft.

14. A rotor for a permanent magnet rotary electric machine, the rotor comprising:
- a rotor shaft;
- a permanent magnet disposed on an outer peripheral surface of the rotor shaft;
- a ring guide portion disposed on the outer peripheral surface adjacent to the permanent magnet in an axial direction of the rotor shaft; and
- one or more retaining rings press-fitted to an outside of the permanent magnet to retain the permanent magnet on the rotor shaft and press-fitted to an outside of the ring guide portion to retain the ring guide portion on the rotor shaft,
- wherein the ring guide portion is configured to gradually increase a diameter of each retaining ring as the retaining ring is moved from a first part of the rotor shaft toward a second part of the rotor shaft.

15. The rotor for a permanent magnet rotary electric machine according to claim 14, wherein the one or more retaining rings comprise:
- a first retaining ring press-fitted to the outside of the permanent magnet to retain the permanent magnet on the rotor shaft; and
- a second retaining ring press-fitted to the outside of the ring guide portion to retain the ring guide portion on the rotor shaft,
- wherein a side of the first retaining ring contacts or is adjacent to a side of the second retaining ring.

16. The rotor for a permanent magnet rotary electric machine according to claim 15, wherein an outer surface of the first retaining ring is flush with an outer surface of the second retaining ring.

17. The rotor for a permanent magnet rotary electric machine according to claim 14, wherein
- the rotor shaft has a large-diameter portion which is provided on one end portion side of the rotor shaft and which has a larger diameter than a portion of the outer peripheral surface of the rotor shaft on which the permanent magnet is disposed,
- the ring guide portion is the large-diameter portion, and
- a diameter of an outer peripheral surface of the large-diameter portion gradually decreases from a permanent magnet side toward an opposite side in the axial direction of the rotor shaft.

* * * * *